United States Patent
Wu et al.

(10) Patent No.: US 9,218,579 B2
(45) Date of Patent: Dec. 22, 2015

(54) METHOD AND SYSTEM FOR FACILITATING RETRIEVAL OF INFORMATION FROM IMAGES

(71) Applicant: Xerox Corporation, Norwalk, CT (US)

(72) Inventors: Wencheng Wu, Webster, NY (US); Edul N Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 194 days.

(21) Appl. No.: 13/870,006

(22) Filed: Apr. 25, 2013

(65) Prior Publication Data

US 2014/0321775 A1 Oct. 30, 2014

(51) Int. Cl.
*G06Q 10/00* (2012.01)
*G06Q 10/06* (2012.01)
*G06F 17/30* (2006.01)
*G06K 9/00* (2006.01)
*G06K 9/03* (2006.01)

(52) U.S. Cl.
CPC .............. *G06Q 10/06* (2013.01); *G06F 17/30* (2013.01); *G06K 9/00771* (2013.01); *G06K 9/00979* (2013.01); *G06K 9/033* (2013.01)

(58) Field of Classification Search
CPC ....... G06Q 10/06; G06K 9/32; G06K 9/0063; G06K 9/6201; G06K 9/00577; G06K 9/00993; H04N 5/23219; H04N 1/00127; H04N 1/00244; H04N 1/00328; H04N 1/00331; H04N 1/00336; H04N 21/472; G06F 17/30867
See application file for complete search history.

(56) References Cited

U.S. PATENT DOCUMENTS

| | | | |
|---|---|---|---|
| 2010/0046842 A1* | 2/2010 | Conwell | 382/218 |
| 2010/0048242 A1* | 2/2010 | Rhoads et al. | 455/556.1 |
| 2010/0054601 A1* | 3/2010 | Anbalagan et al. | 382/180 |
| 2011/0034176 A1* | 2/2011 | Lord et al. | 455/450 |
| 2011/0143811 A1* | 6/2011 | Rodriguez | 455/556.1 |
| 2011/0212717 A1* | 9/2011 | Rhoads et al. | 455/420 |
| 2013/0147845 A1* | 6/2013 | Xie et al. | 345/660 |
| 2013/0262258 A1* | 10/2013 | Jennings | 705/26.4 |
| 2014/0080428 A1* | 3/2014 | Rhoads et al. | 455/88 |
| 2014/0101691 A1* | 4/2014 | Sinha et al. | 725/32 |
| 2014/0156646 A1* | 6/2014 | Brust et al. | 707/722 |
| 2014/0233863 A1* | 8/2014 | Barrington et al. | 382/305 |
| 2014/0280113 A1* | 9/2014 | Hohwald | 707/728 |

OTHER PUBLICATIONS

U.S. Appl. No. 13/352,554, filed Jan. 18, 2012; Burry et al; "License Plate Optical Character Recognition Method and System".

(Continued)

*Primary Examiner* — Jingge Wu

(57) ABSTRACT

Disclosed embodiments relate to systems and methods for facilitating retrieval of information from an image. The one or more image characteristics are modified to degrade the original image. The degraded image is provided as a first task to at least one first remote worker, the first task corresponds to an activity of tagging one or more regions of interest in the degraded image by the at least one first remote worker. Further, one or more second images are generated based on the one or more tagged regions of interest and are provided as one or more second tasks to at least one second remote worker, the one or more second tasks correspond to an activity of retrieving information from the one or more second images.

17 Claims, 5 Drawing Sheets

(56) References Cited

OTHER PUBLICATIONS

U.S. Appl. No. 13/603,451, filed Sep. 5, 2012; Piratla et al; "Method and System for Detecting Anamolies Within Voluminous Private Data".

U.S. Appl. No. 13/336,850, filed Dec. 23, 2011; Bernal; "Obscuring Identification Information in an Image of a Vehicle".

U.S. Appl. No. 13/567,110, filed Aug. 6, 2012; Piratla et al; "Method and System for Processing Application Forms".

U.S. Appl. No. 13/476,239, filed May 21, 2012; Bala et al; "Method and System for Automatically Detecting Multi-object Anomalies Utilizing Joint Sparse Reconstruction Model".

U.S. Appl. No. 13/773,097, filed Feb. 21, 2013; Bala et al; "Anomaly Detection Using a Kernel-based Sparse Reconstruction Model".

U.S. Appl. No. 13/746,412, filed Jan. 22, 2013; Kozitsky et al; "Methods and Systems for Reducing Memory Footprints Associated With Classifiers".

* cited by examiner

METHOD AND SYSTEM FOR FACILITATING RETRIEVAL OF INFORMATION FROM IMAGES

TECHNICAL FIELD

The presently disclosed embodiments are related to crowdsourcing. More particularly, the presently disclosed embodiments are related to methods and systems for facilitating retrieval of information from images by crowdsourcing.

BACKGROUND

In recent times, crowdsourcing has emerged as a convenient and economical method for organizations to outsource tasks, which require human involvement. The tasks are generally uploaded on a crowdsourcing platform, from where crowdworkers associated with the crowdsourcing platform may select the tasks. However, while performing such tasks, privacy has been a major concern. There may be a risk that the crowdworkers performing the tasks may access and subsequently misuse the private information available in the tasks. As an example, while performing a task that involves handwriting recognition in a medical form, crowdworkers may collect sufficient private information such as, but is not limited to, a name, an address, a phone number, an email address, a social security number, a patient ID, medicines use and so forth. Similarly, in another example, the crowdworkers performing the task of video labeling for traffic surveillance systems may collect the information pertaining to vehicle driver, vehicle type, location of vehicle etc. In view of the above, there remains a need for an efficient way to perform crowdsourcing tasks taking care of privacy concerns.

SUMMARY

According to embodiments illustrated herein, there is provided a method for facilitating retrieval of information from an original image. The method includes modifying one or more image characteristics to degrade the original image. In addition, the method includes providing the degraded image as a first task to at least one first remote worker or a crowdsourcing platform server, the first task corresponding to an activity of tagging one or more regions of interest in the degraded image by the at least one first remote worker. In addition, the method includes receiving the one or more tagged regions of interest in response to the first task. Further, the method includes providing one or more second images as one or more second tasks to at least one second remote worker or the crowdsourcing platform server. The one or more second images are generated based on the one or more tagged regions of interest and the one or more second tasks correspond to an activity of retrieving the information from the one or more second images.

According to embodiments illustrated herein, there is provided a system for facilitating retrieval of information from an original image. The system includes a memory and one or more processors. The memory includes an image-processing module and a communication manager. The image-processing module is configured to modify one or more image characteristics to degrade the original image. The communication manager is configured to provide the degraded image as a first task to at least one first remote worker or a crowdsourcing platform server, the first task corresponding to an activity of tagging one or more regions of interest in the degraded image by the at least one first remote worker. The communication manager is further configured to receive the one or more tagged regions of interest in response to the first task. The communication manager is further configured to provide one or more second images as one or more second tasks to at least one second remote worker or the crowdsourcing platform server. The one or more second images are generated based on the one or more tagged regions of internet and the one or more second tasks correspond to an activity of retrieving the information from the one or more second images. The one or more processors are configured to execute the set of instructions in the image processing module and the communication manager.

According to embodiments illustrated herein, there is provided a computer program product for use with a computer. The computer program product includes a computer-usable data carrier storing a computer-readable program code embodied therein for modifying one or more image characteristics to degrade the original image. The computer-readable program code performs: providing the degraded image as a first task to at least one first remote worker or a crowdsourcing platform server, the first task corresponding to an activity of tagging one or more regions of interest in the degraded image by the at least one first remote worker; receiving the one or more tagged regions of interest in response to the first task; and providing one or more second images as one or more second tasks to at least one second remote worker or the crowdsourcing platform server. The one or more second images are generated based on the one or more tagged regions of interest, and the one or more second tasks correspond to an activity of retrieving the information from the one or more second images.

BRIEF DESCRIPTION OF DRAWINGS

The accompanying drawings illustrate various embodiments of systems, methods, and various other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
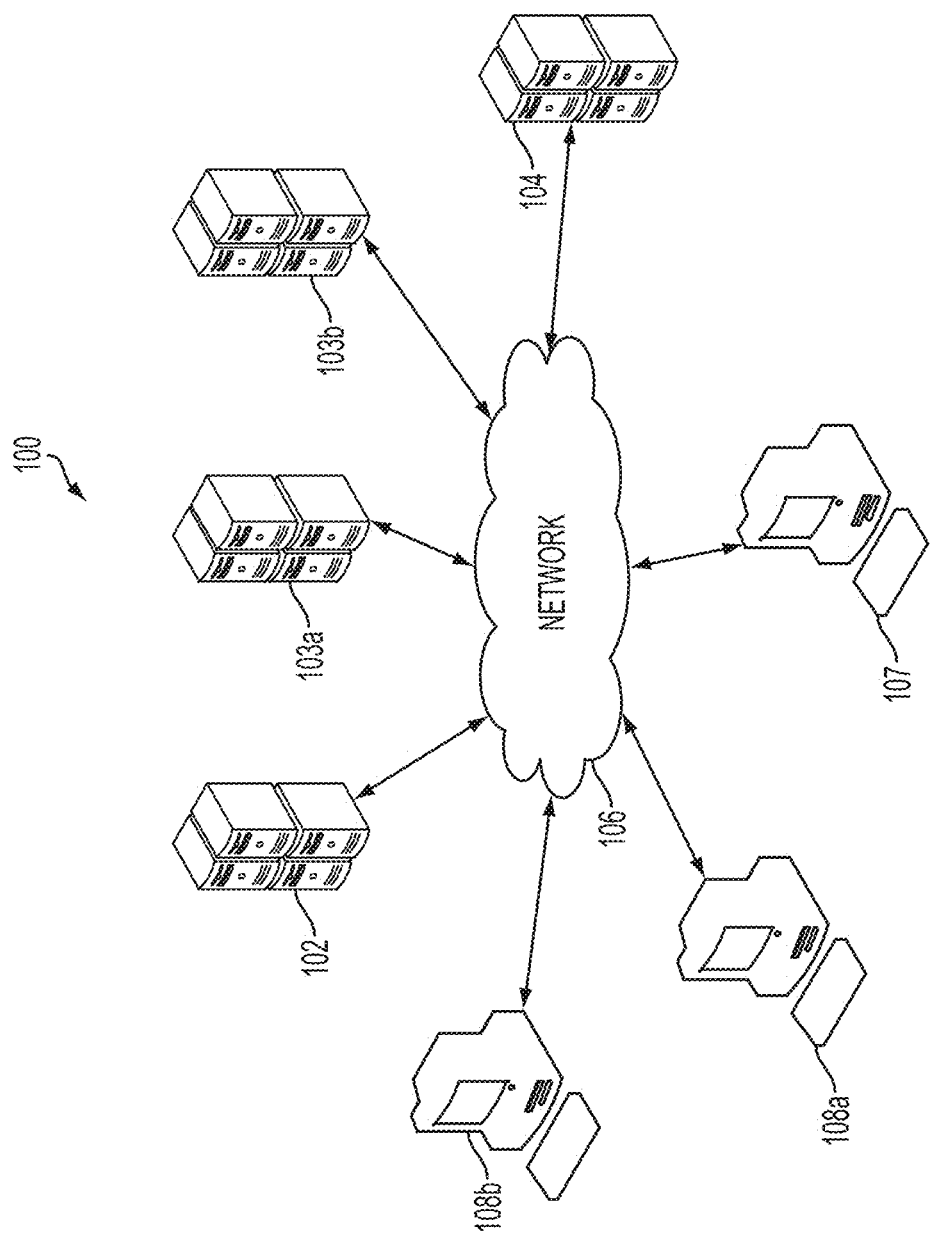
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

A "crowdsourcing platform" refers to a business application, wherein a broad, loosely defined external group of people, community, or organization provides solutions as outputs for any specific business processes received by the application as input. In an embodiment, the business application may be hosted online on a web portal (e.g., the crowdsourcing platform servers). Various examples of the crowdsourcing platforms include, but are not limited to, Amazon Mechanical Turk or Crowd Flower.

"Remote worker" or "crowdworker" refers to a worker or a group of workers that may perform one or more tasks that generate data that contribute to a defined result, such as proofreading part of a digital version of an ancient text or analyzing a small quantum of a large volume of data. According to the present disclosure, the remote worker includes, but is not limited to, a satellite center employee, a rural business process outsourcing (BPO) firm employee, a home-based employee, or an internet-based employee. Hereinafter, "remote worker", worker, "crowdsourced workforce," "crowdworker," "crowd workforce," and "crowd" may be interchangeably used.

An "image" refers to a collection of data, including image data in any format, retained in an electronic form. In an embodiment, the image may correspond to a pictorial representation of an object or a document. Further, the image may correspond to an electronic document or to a frame of a video footage. Examples of the image may include, but are not limited to, a digitized document having handwritten content in it, a photographic image, a snapshot of a web page and the like. The examples of the video footage may include, but are not limited to, recorded videos for traffic movement, people movement and the like.

"Image characteristics" refers to visual properties associated with the image such as, but not limited to, brightness, color, resolution, contrast, and the like.

"Private information" refers to information that includes personal details pertaining to an individual. Examples of the private information may include, but are not limited to, a name, an address, a phone number, an email address, a social security number, the location of a place, a vehicle registration number, the color of a vehicle, the make and model of a vehicle, and the like.

A "region of interest" refers to a portion of the image containing the private information.

A "task" refers to the activity assigned to the crowdworkers. The activity may correspond to tagging of the region of interest, highlighting a portion in the image, digitization of the handwritten content, image labeling, video labeling, and the like.

FIG. 1 is a block diagram illustrating a system environment 100 in which various embodiments may be implemented. Various embodiments of methods and systems for facilitating retrieval of information from an image are implementable in the system environment 100. The system environment 100 includes an application server 102, crowdsourcing platform servers 103*a* and 103*b* (hereinafter referred to as crowdsourcing platform servers 103), a database server 104, a network 106, a requester computing device 107 and worker computing devices 108*a* and 108*b* (hereinafter referred to as worker computing devices 108). The application server 102, the crowdsourcing platform servers 103, the database server 104, the requester computing device 107, and the worker computing devices 108 are interconnected over the network 106.

FIG. 1 shows, for simplicity, only one application server 102 and only one database server 104. However, it will be apparent to a person having ordinary skill in the art that the disclosed embodiments may also be implemented using multiple applications servers 102 and multiple database servers 104. In an embodiment, a crowdworker may perform tasks using a variety of computing devices, other than shown worker computing device 108, such as a laptop, a personal digital assistant (PDA), a tablet computer (e.g., iPad®, and Samsung Galaxy Tab®), and the like.

The application server 102 may be any device that is capable to host an application/tool/framework in accordance with at least one embodiment of the present disclosure. As the application server 102 is interconnected with the requester computing device 107, the worker computing devices 108, and the crowdsourcing platform servers 103, any information pertaining to the crowdsourced tasks received from the requester goes to the crowdworkers via the crowdsourcing platform servers 103.

In an embodiment, the requester may access the application server 102 and submit information pertaining to the tasks to be crowdsourced. In this case, the requester accesses the application server 102 over the network 106 to submit the information pertaining to the tasks (may be through a web based interface).

The crowdsourcing platform servers 103 are devices or computers that host one or more crowdsourcing platforms. In an embodiment, the crowdsourcing platform servers 103 host the application/tool/framework. The requester may post the information on the crowdsourcing platform servers 103 for the tasks, which can subsequently be outsourced to the crowdworkers.

In yet another embodiment, the application may also be installed on the worker computing device 108 without limiting the scope of the invention.

The database server 104 may refer to a device or a computer that maintains a repository of the tasks assigned to the crowdworkers. In an embodiment, the database server 104 may store data pertaining to the tasks such as, but not limited to, cost of the tasks and expected time of the completion of the tasks. The database server 104 may receive a query from the application server 102 or the crowdsourcing platform server 103 to retrieve the data pertaining to the tasks. For querying the database server 104, one or more querying languages may be utilized such as, but are not limited to, SQL, QUEL, DMX, and so forth. Further, the database server 104 may be realized through various technologies, such as, but not limited to, Microsoft® SQL server, Oracle, and My SQL. In an embodiment, the application server 102 may be connected to the database server 104 using one or more protocols such as, but not limited to, ODBC protocol and JDBC protocol.

A person skilled in the art would understand that the scope of the disclosure should not be limited to the database server 104 as a separate entity. In an embodiment, the application server 102, the database server 104, and the crowdsourcing platform server 103 may be integrated into a single server without limiting the scope of the invention.

The network 106 corresponds to a medium through which content and messages flow between various devices of the system environment 100 (e.g. the worker computing device 108, the database server 104, the application server 102, the crowdsourcing platform servers 103, and the requester computing devices 107). Examples of the network 106 may include, but are not limited to, a Wireless Fidelity (Wi-Fi) network, a Wide Area Network (WAN), a Local Area Network (LAN) or a Metropolitan Area Network (MAN). Various devices in the system environment 100 can connect to the network 106 in accordance with the various wired and wireless communication protocols such as Transmission Control Protocol and Internet Protocol (TCP/IP), User Datagram Protocol (UDP), and 2G, 3G, or 4 G communication protocols.

Figure 2:
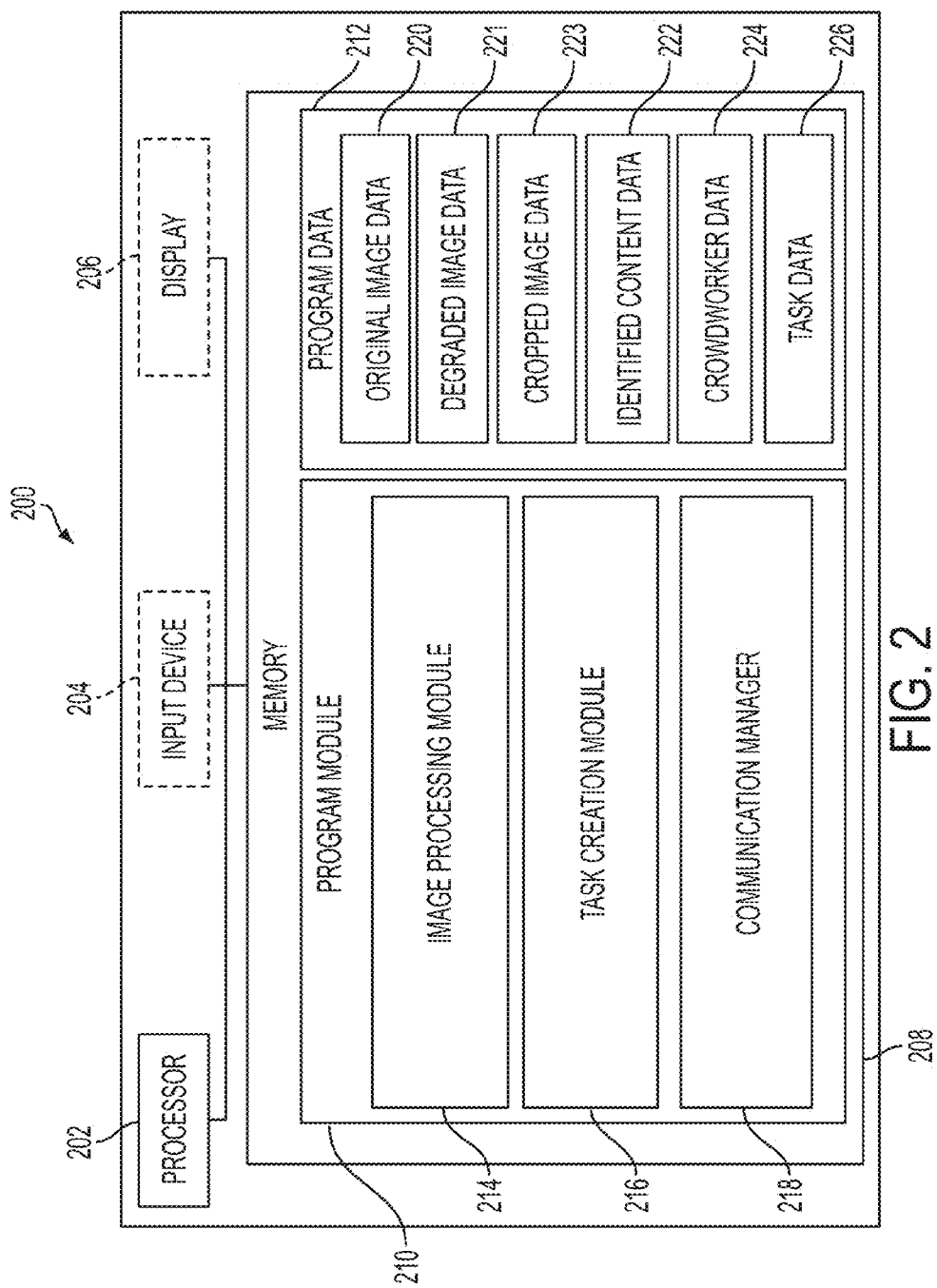
FIG. 2 is a block diagram illustrating a system for facilitating retrieval of information from an original image in accordance with at least one embodiment.

FIG. 2 is a block diagram illustrating a system 200 for facilitating retrieval of information from an original image in accordance with at least one embodiment. The system 200 includes a processor 202, an input device 204, a display 206, and a memory 208. In an embodiment, the system 200 may correspond to any of the worker computing device 108, the application server 102, or the crowdsourcing platform server 103.

The processor 202 is coupled to the input device 204, the display 206, and the memory 208. The processor 202 executes a set of instructions stored in the memory 208 to perform one or more operations. The processor 202 may be realized through a number of processor technologies known in the art. Examples of the processor 202 include, but are not limited to, an X86 processor, a RISC processor, an ASIC processor, a CISC processor, or any other processor.

In an embodiment, the input device 204 receives an input to upload the tasks on the system 200. Examples of the input device 204 include, but are not limited to, a mouse, a keyboard, a touch panel, a track-pad, a touch screen, or any other device that has the capability of receiving the user input.

The display 206 displays various interfaces while uploading the tasks on the system 200. The display 206 may be realized through several known technologies, such as, a Cathode Ray Tube (CRT) based display, a Liquid Crystal Display (LCD), a Light Emitting Diode (LED)-based display, an Organic LED display technology, and a Retina Display technology. Further, the display 206 can be a touch screen that receives the user input.

The memory 208 stores a set of instructions and data. Some of the commonly known memory implementations include, but are not limited to, a random access memory (RAM), a read only memory (ROM), a hard disk drive (HDD), and a secure digital (SD) card. Further, the memory 208 includes a program module 210 and a program data 212. The program module 210 includes a set of instructions that is executable by the processor 202 to perform various operations. The program module 210 further includes an image-processing module 214, a task creation module 216, and a communication manager 218. It will be apparent to a person having ordinary skills in the art that the set of instructions stored in the memory 208 enables the hardware of the system 200 to perform the predetermined operation.

The program data 212 includes an original image data 220, a degraded image data 221, a cropped image data 223, an identified content data 222, a crowdworker data 224, and a task data 226.

The image-processing module 214 is configured to modify the one or more image characteristics to degrade the original image stored in the memory 208 as the original image data 220. In an embodiment, the modification of the one or more image characteristics includes at least one of a color to gray conversion of the original image, a spatial resolution reduction of the original image, an addition of noise to the original image, or a mapping of a color in the original image to a random color (based on a pre-determined rule). However, it would be apparent to a person skilled in the art that the above mentioned techniques for modifying image characteristics are for example purposes and other applicable/suitable techniques may also be used without deviating from the scope of the ongoing description. The degraded image is stored in the memory 208 as the degraded image data 221. In an embodiment, the one or more image characteristics are modified such that the information in the original image is unrecognizable but position/location of one or more regions of interest may be identified by the crowdworkers. Further, the image-processing module 214 is configured to generate one or more second images. The one or more second images may be stored in the memory 208 as the cropped image data 223. In an embodiment, the image-processing module 214 is configured to crop one or more portions from the original image based on one or more tagged regions of interest to generate the one or more second images. For example, co-ordinates corresponding to the one or more tagged regions may be used to identify the one or more portions in the original image. In an alternate embodiment, the image-processing module 214 is configured to modify the one or more characteristics of the one or more tagged regions of interest in the degraded image to generate the one or more second images.

The task creation module 216 is configured to create a first task using the degraded image. In an embodiment, the first task may include necessary metadata information for performing the first task such as tagging the one or more regions of interest. The task creation module 216 may utilize the task data 226 in the memory 208 to create the first task. Additionally, the task creation module 216 is configured to create one or more second tasks. In an embodiment, the one or more second tasks are generated by the task creation module 216 using the cropped image data 223 and the task data 226 in the memory 208. Further examples of the first task and the one or more second tasks are described in conjunction with FIG. 4 and FIG. 5

The communication manager 218 in the program module 210 is configured to transmit the first task containing the degraded image. In an embodiment, the first task is provided to the crowdsourcing platform servers 103, from where the tasks may be attempted by the crowdworkers over the network 106. In an alternate embodiment, the communication manager 218 provides the first task to the worker computing device 108 over the network 106. The communication manager 218 is further configured to receive the one or more tagged regions of the interest. Additionally, the communication manager 218 is configured to provide the one or more second tasks to at least one second remote worker or the crowdsourcing platform server 103. In an embodiment, the communication manager 218 is further configured to receive responses corresponding to the one or more second tasks. The communication manager 218 may include various protocol stacks such as, but not limited to, Transmission Control Protocol and Internet Protocol (TCP/IP), User Datagram Protocol (UDP), 2G, 3G or 4G communication protocols. The communication manager 218 transmits and receives the messages/data in accordance with such protocol stacks.

Figure 3:
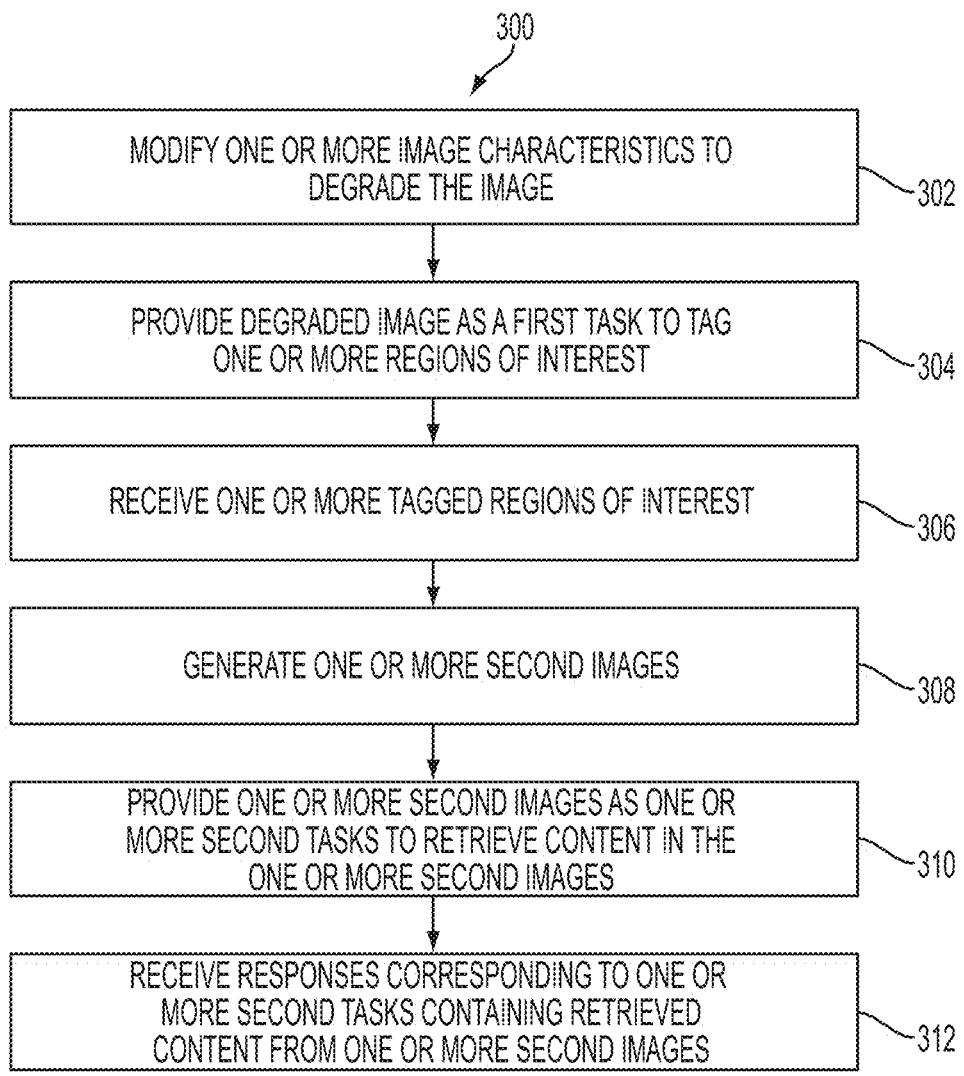
FIG. 3 is a flow diagram illustrating a method for facilitating retrieval of information from an original image in accordance with at least one embodiment.

FIG. 3 is a flow diagram 300 illustrating a method for facilitating retrieval of information from the original image in accordance with at least one embodiment. The flow diagram 300 is described in conjunction with FIG. 1 and FIG. 2.

At step 302, the one or more image characteristics are modified to degrade the original image. The modification is done by the image-processing module 214 (refer to FIG. 2). The one or more image characteristics may correspond to brightness, color, resolution, contrast and the like. The image may be degraded by the at least one of the color to gray conversion of the original image, the spatial resolution reduction of the original image, the addition of noise in the image, or the mapping of the color in the original image to the random color based on the pre-determined rule. Modification of the original image in various embodiments is explained later in conjunction with FIG. 4 and FIG. 5.

At step 304, the degraded image is provided as the first task to tag the one or more regions of interest. In an embodiment, the degraded image is transmitted by the communication manager 218 to the crowdsourcing platform server 103, from where the at least one first remote worker may access the first task over the network 106. The communication manager 218 transmits the degraded image in accordance with the protocols stacks discussed in FIG. 2. In an alternate embodiment, the first task is provided to the at least one first remote worker when the at least one first remote worker accesses the crowdsourcing platform server 103 using the worker computing device 108. The at least one first remote worker tags the one or more regions of interest in the degraded image for completing the first task. The at least one first remote worker may tag the one or more regions of interest in the degraded image by pointing devices, such as a mouse and the like. In an embodiment, the at least one first remote worker submits the first task after tagging the one or more regions of interest in the degraded image.

In an embodiment, a degradation level of the first task may be determined by the image-processing module 214 to ensure that the at least first remote worker is able to perform the first task (e.g., the tagging of the one or more regions of interest) without actually accessing the information in the one or more regions of interest. In an embodiment, the degradation level may be determined by using at least one of a response time for the first task, a comparison between the responses for the multiple first tasks, a comparison between the response for the first task and the information in the original image, or a feedback from the at least one first remote worker. Further, in an embodiment, the image-processing module 214 reduces the degradation of the degraded image based on the determined degradation level. In an alternate embodiment, the degradation level may be used for future degradation of the original image such that the at least one first remote worker can perform the first task without being able to access the information in the one or more regions of interest.

At step 306, the one or more tagged regions of interest are received. In an embodiment, the one or more tagged regions of interest are received by the communication manager 218 over the network 106.

At step 308, the one or more second images are generated based on the one or more tagged regions of interest. In an embodiment, the image-processing-module 214 crops one or more portions from the original image based on the one or more tagged regions. In an alternate embodiment, the image-processing module 214 modifies the one or more characteristics of the one or more tagged regions of interest in the degraded image to generate the one or more second images. The one or more second images are generated such that the crowdworkers can retrieve the information in the one or more second images.

At step 310, the one or more second images are provided as one or more second tasks to retrieve information in the one or more second images. In an embodiment, the one or more second tasks are transmitted to the at least one second remote worker by the communication manager 218 when the at least one second remote worker accesses the crowdsourcing platform server 103 over the network 106. In an alternate embodiment, the one or more second tasks are transmitted by the communication manager 218 to the crowdsourcing platform servers 103. In an embodiment, the first task and the one or more second tasks are assigned to/attempted by different crowdworkers by the system 200 based on the crowdworker data 224, which may store the data pertaining to different tasks already assigned to the crowdworkers. The at least one second remote worker retrieves the information in the one or more second images to perform the one or more second tasks.

At step 312, the responses corresponding to the one or more second tasks are received by the communication manager 218 from the at least one second remote worker. In an embodiment, the responses may be stored as the identified content data 222 in the memory 208.

Figure 4:
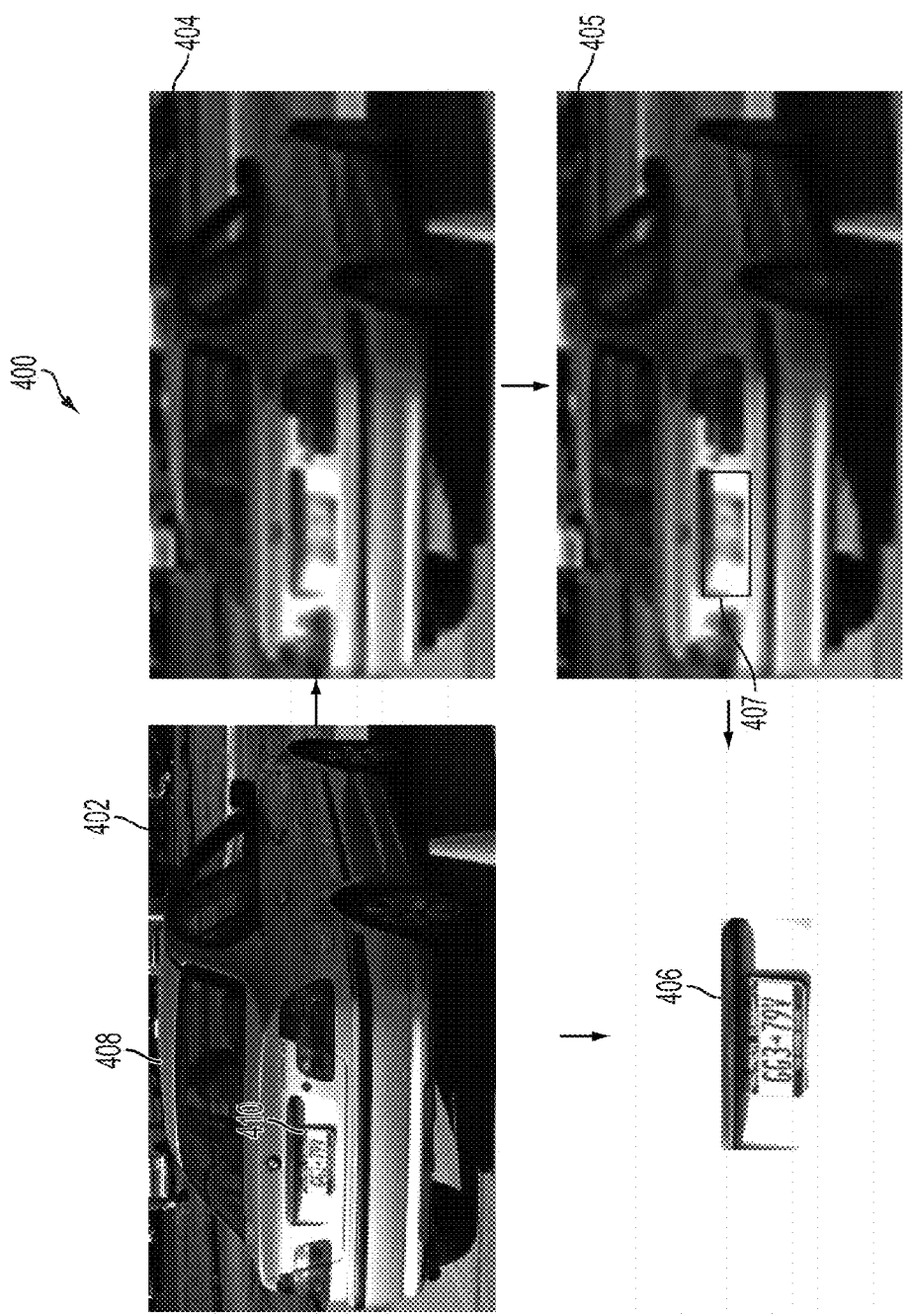
FIG. 4 illustrates a series of images in accordance with at least one embodiment.

FIG. 4 illustrates a series of images 400 in accordance with at least one embodiment. The series of images 400 includes a first image 402, a degraded image 404, a tagged image 405, and a second image 406. In an embodiment, the first image 402 corresponds to a frame of a video footage in a traffic surveillance system. The first image 402 includes a vehicle 408 and a license plate 410. In an embodiment, the series of images 400 corresponds to a task of license plate recognition for the traffic surveillance systems.

In accordance with step 302, the one or more characteristics of the first image 402 are modified to generate the degraded image 404. In an embodiment, the modification is performed by the image-processing module 214 by color to gray conversion, however as discussed previously, other known techniques may also be used for modifying the first image 402. The modification is made such that the crowdworkers accessing the degraded image 404 (i.e., as the first task) cannot recognize alphanumeric characters (i.e., the private information) on the license plate 410 (i.e., the region of interest) whereas the location/position of the vehicle 408 and that of license plate 410 can be identified by the crowdworkers in the degraded image 404. In an embodiment, the color of the vehicle may also be made unidentifiable in the degraded image 404. The degraded image 404 may be stored in the memory 208 as the degraded image data 221. The task creation module 216 creates the first task using the degraded image 404. While creating the first task the task creation module 216 may include various types of metadata information such as, but not limited to, cost of the first task, expected time of completion of the first task, instructions for how to perform the first task and so forth. In an embodiment, the metadata information is extracted from the task data 226 stored in the memory 208.

In accordance with step 304, the first task is transmitted by the communication manager 218 to tag the one or more regions of interest. In an embodiment, the first task contains the metadata information that the at least one first remote worker has to tag the license plate 410. As described above the at least one first remote worker can identify the location/position of the license plate 410 and may thus tag the license plate 410. In an embodiment, the first task may be submitted by the at least one first remote worker after tagging the license plate 410 (as depicted in tagged image 407).

In accordance with the step 306, the tagged license plate 407 is received by the communication manager 218, as depicted in FIG. 4.

In accordance with the step 308, the second image 406 is generated based on the tagged license plate 407. In an embodiment, the second image 406 is generated by cropping out the portion containing the tagged license plate 407 from the first image 402. In an alternate embodiment, the tagged license plate 407 in the tagged image 405 is modified and cropped by the image-processing module 214 to generate the second image 406. The modification is performed such that the alphanumeric characters can be retrieved by the crowdworkers accessing the second image 406. In an embodiment, the task creation module 216 creates the second task using the second image 406. Further, various types of the metadata information, as described above, may be used while creating the second task. In an embodiment, the metadata information includes that the crowdworker has to retrieve the alphanumeric characters in the second image 406.

In accordance with step 310, the second image 406 is provided as the second task to the at least one second remote worker. In an embodiment, the second task is preferably transmitted to the at least one second remote worker such that the at least one second remote worker is different from the at least one first remote worker. As discussed, in an alternate embodiment, the second task is transmitted to the crowdsourcing platform server 103, from where the at least one second remote worker may access the second task over the network 106. Using the metadata information in the second task, the at least one second remote worker retrieves the alphanumeric characters on the license plate 410 and submits the second task.

In accordance with step 312, the responses corresponding to the second task, i.e., retrieved alphanumeric characters on the license plate 410, are received by the communication manager 218. The retrieved alphanumeric characters may be stored as the identified content data 222 in the memory 208.

In an embodiment, for example, a task of anomaly labeling in the traffic surveillance videos may also be implemented in a similar way as described above. The image corresponding to videos may be degraded using the methods disclosed above such that the crowdworkers cannot access the information in the degraded image such as a vehicle color, a face of the driver etc., whereas the vehicle location and any sort of anomaly may be identified in the degraded image/video by the crowdworkers. The crowdworkers may be presented with the degraded image/video and subsequently crowdworkers may label the anomaly in the image. It will be appreciated by those skilled in the art that in the described method of the task of anomaly labeling, generation of the one or more second images will not be required.

Figure 5:
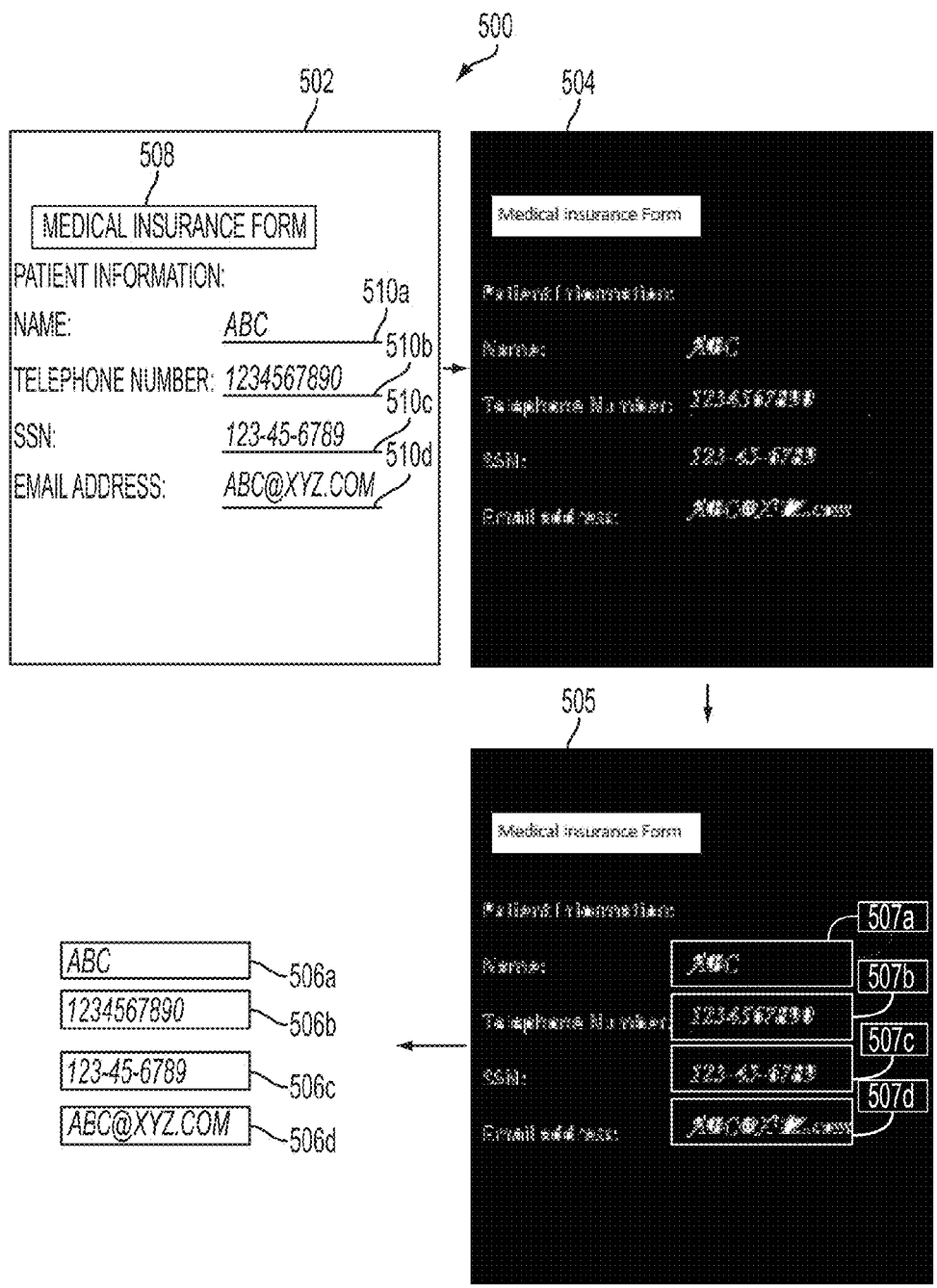
FIG. 5 illustrates another series of images in accordance with at least one embodiment.

FIG. 5 illustrates another series of images 500 in accordance with at least one embodiment. In an embodiment, the other series of images 500 corresponds to a task of handwriting recognition in a medical form. The other series of images 500 includes a medical form 502, a degraded medical form 504, a tagged medical form 505, and multiple patient information images 506a, 506b, 506c, and 506d (hereinafter referred to collectively as patient information images 506). The medical form 502 includes a form information field 508 and multiple patient information fields 510a, 510b, 510c and 510d (hereinafter referred to collectively as patient information fields 510).

The medical form 502 is degraded by image-processing module 214 (as described in step 302) to generate the degraded medical form 504. In an embodiment, the medical form 502 is degraded by resolution reduction. The medical from 502 is degraded such that the crowdworker accessing the degraded medical form 504 cannot retrieve the characters written in the patient information fields 510 as depicted in FIG. 5. Further, the task creation module 216 creates the first task using the degraded medical form 504. While creating the first task, the task creation module 216 may utilize the task data 226 stored in the memory 208.

The first task is transmitted by the communication manager 218. As described above, the first task may be transmitted to the at least one first remote worker or the crowdsourcing platform server 103. Further, the first task may include the metadata information for performing the first task. In an embodiment, the first task includes the metadata information that the at least one first remote worker should tag the patient information field 510, which contains the handwritten content. Using the metadata information, the at least first remote worker tags the patient information fields 510 to generate the tagged medical form 505 and submits the first task.

The tagged medical form 505 with tagged patient information field 507a, 507b, 507c and 507d (hereinafter referred to as tagged patient information field 507), as depicted in the tagged medical form 505 in FIG. 5, is received by the communication manager 218 (in accordance with step 306).

The image-processing module 214 may generate the multiple patient information images 506, in accordance with step 308, as shown in FIG. 5. The multiple patient information image 506 may be generated by cropping the one or more portions of the medical form 502 based on the tagged patient information field 507. In an alternate embodiment, the tagged information fields 507 may be modified to generate the patient information image 506. The multiple patient information images 506 are generated such that the crowdworkers accessing the multiple patient information images 506 can retrieve the characters written in the patient information images 506. Further, the task creation module 216 may create the one or more second tasks by using the multiple patient information images 506. In an embodiment, the one or more second tasks are randomly distributed to the second remote workers using the techniques known in the art. Further, the one or more second tasks are created by using the task data 226 stored in the memory 208 such that the metadata information required for performing the multiple second tasks is embedded in the multiple second tasks.

The multiple patient information images 506 are transmitted as multiple second tasks, in accordance with step 310. In an embodiment, the communication manager 218 provides the second tasks such that the first tasks and second tasks are assigned to different remote workers. Further, in an embodiment, the communication manager 218 may store the data corresponding to the first remote workers and the second remote workers as the crowdworker data 224 in the memory 208. Using the metadata information in the second tasks, the at least one second remote worker may retrieve the characters written in the patient information images 506. In an embodiment, the second task may contain different response regions for the at least one second remote worker to fill in the retrieved characters. Post retrieval, the at least one second remote workers may submit the second tasks.

The retrieved characters are received by the communication manager 218 as described in step 312. Further, the retrieved characters may be stored as the identified content data 222 in the memory 208.

The disclosed embodiments encompass numerous advantages. In the first step, the image is degraded in such a way that the crowdworkers accessing the tasks are capable of getting the context of the images such as location of the private information in the image whereas the crowdworkers cannot access the details of the private information. Further, the second image is generated such that the second crowdworkers can access the details of the private information but cannot relate the private information with the context of the second image. By presenting the tasks to the crowdworkers in such a manner, the privacy concerns associated with the crowdsourcing tasks can be taken care of efficiently.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the internet through an input/output (I/O) interface, allowing the transfer as well as reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks, such as steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of a method and system for facilitating retrieval of information from images have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for retrieving information from an original image, the method comprising:
    modifying one or more image characteristics of the original image to degrade the original image;
    providing the degraded original image as a first task to at least one first remote worker, wherein the first task comprises metadata that comprises information pertaining to one or more regions of interest that are to be tagged by the at least one first remote worker, and wherein the information in the one or more regions of interest is not retrievable by the at least one first remote worker;
    receiving the one or more tagged regions of interest in response to the first task;

cropping one or more portions from the original image, wherein the coordinates of the one or more portions are same as the coordinates of the one or more tagged regions of interest in the degraded original image, received from the at least one first remote worker;

providing the one or more cropped portions as one or more second tasks to at least one second remote worker, wherein the one or more second tasks correspond to an activity of retrieving character information from the one or more cropped portions, wherein the at least one first remote worker is different from the at least one second remote workers, wherein the method is performed by one or more processors.

2. The method of claim 1 further comprising modifying the one or more image characteristics of the one or more tagged regions of interest in the degraded original image to generate the one or more cropped portions.

3. The method of claim 1 further comprising determining a degradation level of the original image based on at least one of a response time for the first task, a comparison between the responses for the multiple first tasks, a comparison between the response for the first task and the information in the original image, or a feedback from the at least one first remote worker.

4. The method of claim 3 further comprising reducing the degradation of the degraded original image based on the determined degradation level.

5. The method of claim 1, wherein the location of the information in the degraded original image is identifiable.

6. The method of claim 1, wherein the modifying the one or more image characteristics comprises performing at least one of a color to gray conversion of the original image, a spatial resolution reduction of the original image, an addition of noise in the original image, or a mapping of a color in the original image to a random color based on a pre-determined rule.

7. The method of claim 1, wherein the one or more second tasks correspond to at least one of a license plate recognition, a handwriting recognition in a digitized document, or a video labeling in a traffic surveillance system.

8. The method of claim 1, wherein the image corresponds to at least one of a digitized document having handwritten content, a still image, or a frame of a video footage.

9. A system for facilitating retrieval of information from an original image, the system comprising:
a memory comprising:
an image-processing module configured to modify one or more image characteristics of the original image to degrade the original image, and
a communication manager configured to:
provide the degraded original image as a first task to at least one first remote worker, wherein the first task comprises metadata that comprises information pertaining to one or more regions of interest that are to be tagged by the at least one first remote worker, and wherein the information in the one or more regions of interest is not retrievable by the at least one first remote worker,
receive the one or more tagged regions of interest in response to the first task,
the image-processing module configured to crop one or more portions from the original image, wherein the coordinates of the one or more portions are same as the coordinates of the one or more tagged regions of interest in the degraded original image, received from the at least one first remote worker;

provide the one or more cropped portions as one or more second tasks to at least one second remote worker, wherein the one or more second tasks correspond to an activity of retrieving character information from the one or more cropped portions, wherein the at least one first remote worker is different from the at least one second remote worker; and
one or more processors configured to execute the communication manager, the feature determination module, and the statistical model.

10. The system of claim 9 further comprising a task creation module configured to create the first task and the one or more second tasks.

11. The system of claim 9, wherein the image corresponds to at least one of a digitized document having handwritten content, a still image, or a frame of a video footage.

12. The system of claim 9, wherein the image-processing module is configured to modify the one or more image characteristics by at least one of a color to gray conversion of the original image, a spatial resolution reduction of the original image, an addition of noise in the image, or a mapping of a color in the original image to a random color based on a pre-determined rule.

13. The system of claim 9, wherein the one or more second tasks correspond to at least one of a license plate recognition, a handwriting recognition in a digitized document, or a video labeling in traffic surveillance system.

14. The system of claim 9, wherein the image-processing module is further configured to determine a degradation level of the first task based on at least one of a response time for the first task, a comparison of the responses for multiple first tasks, a comparison of the response for the first task and the information in the original image, or a feedback from the at least one first remote worker.

15. The system of claim 14, wherein the image-processing module is further configured to reduce the degradation of the degraded original image based on the determined degradation level.

16. The system of claim 9, wherein the information in the degraded image is not recognizable by the first remote worker, and wherein the location of the information in the degraded original image is identifiable.

17. A computer program product for use with a computer, the computer program product comprising a non-transitory computer readable medium, the non-transitory computer readable medium stores a computer program code for facilitating retrieval of information from an original image, the computer program code performing a method, the method comprising:
modifying one or more image characteristics of the original image to degrade the original image;
providing the degraded original image as a first task to at least one first remote worker, wherein the first task comprises metadata that comprises information pertaining to one or more regions of interest that are to be tagged by the at least one first remote worker, wherein the information in the one or more regions of interest is not recognizable by the first remote worker;
receiving the one or more tagged regions of interest in response to the first task;
cropping one or more portions from the original image, wherein the coordinates of the one or more portions are same as the coordinates of the one or more tagged regions of interest in the degraded original image, received from the at least one first remote worker;
providing the one or more cropped portions as one or more second tasks to at least one second remote worker or the crowdsourcing platform server, wherein the one or more second tasks correspond to an activity of retrieving character information from the one or more cropped portions, wherein the at least one first remote worker is different from the at least one second remote worker, wherein one or more image characteristics of the one or more tagged regions of interests are modified such that the information in the one or more tagged regions of interest is recognizable by the at least one second remote worker.

* * * * *